Sept. 15, 1970   H. STACKEGARD   3,529,172
STATIC CONVERTER STATION WITH PROVISION FOR
FEEDING A LOCAL NETWORK
Filed Sept. 9, 1968
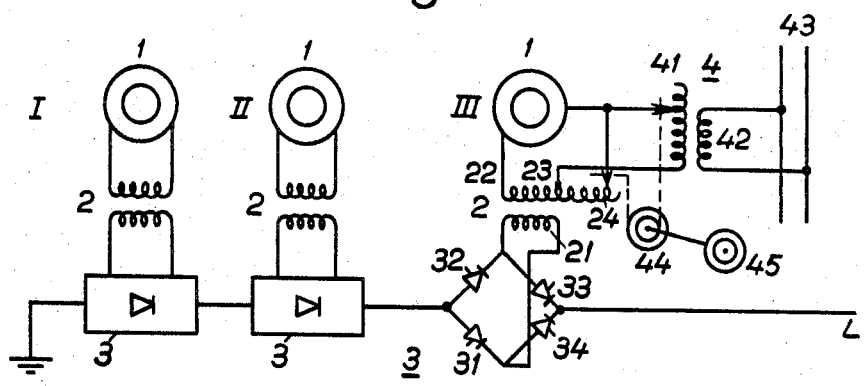
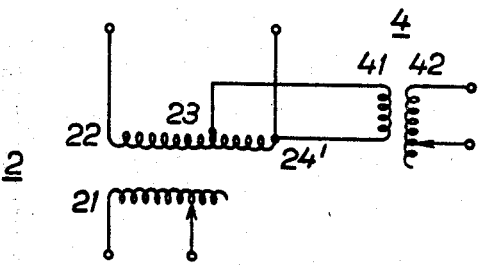
INVENTOR.
HANS STACKEGARD
BY

United States Patent Office 3,529,172
Patented Sept. 15, 1970

3,529,172
STATIC CONVERTER STATION WITH PROVISION FOR FEEDING A LOCAL NETWORK
Hans Stackegard, Ludvika, Sweden, assignor to Allmanna Svenska Elektriska Aktiebolaget, Vasteras, Sweden, a corporation of Sweden
Filed Sept. 9, 1968, Ser. No. 758,316
Claims priority, application Sweden, Sept. 19, 1967, 12,900/67
Int. Cl. G05f 1/14; H02j 3/46
U.S. Cl. 307—26
3 Claims

ABSTRACT OF THE DISCLOSURE

A converter station is formed of a number of converters with their direct current sides connected in series to a power transmission line, and their alternating current sides connected to individual alternating current machines through converter transformers. The converter-transformer of one of the converters is provided with an adjustable output including an adjustable transformer to feed a local network.

BACKGROUND OF THE INVENTION

Field of the invention

The present invention relates to a converter station comprising a number of converters the direct current sides of which are connected to a power transmission line and which are connected on the alternating current side to individual alternating current machines through a converter-transformer, which converter station, besides forming part of a direct current power transmission link, is intended to supply a local network with power. The purpose of the invention is to enable said local power supply to take place with the least possible intervention in the converter station.

The prior art

If large units are involved in such a converter station, that is large alternating current machines, for example generators, and thus large converters, it is often desirable to avoid connecting these units on the alternating current side in order to avoid considerable short-circuiting power on the alternating current side of the station. The most obvious solution of the local power question would be to connect all the converters on the alternating current side by means of an intermediate bar, but this is rather expensive and also the advantage of the separate units is then lost. Another possibility is to take out the local power from a tertiary winding on a converter-transformer but in that case tertiary windings must usually be arranged on all the converter-transformers.

Since the direct current is the same in all the series-connected converters a current reduction in one converter for the power output to the local network would also cause the same current reduction in the other converters. Thus such a solution, besides being expensive, would also be uneconomical in operation.

SUMMARY OF THE INVENTION

According to the present invention the converters are kept entirely separated from each other on the alternating current side and the local power is taken out from one of the converter transformers and this takes place in such a way that this converter-transformer is provided with an adjustable output which is connected to an adjustable transformer for the local network. By adjusting said output and said transformer for the local network, variable power can be obtained on the local network with unaltered local power voltage.

The invention will mainly be used on large rectifier stations where the different rectifiers are connected to individual generators, but it is clear that the principle can also be used in an inverter station where a number of inverters are connected to individual large alternating current machines, for example for operating a pump station for a water power reservoir.

BRIEF DESCRIPTION OF THE DRAWINGS

The invention will be further described with reference to the accompanying drawing, where FIGS. 1 and 2 show two different embodiments according to the invention.

DESCRIPTION OF THE PREFERRED EMBODIMENTS

FIG. 1 shows a converter station according to the invention comprising three units I, II, III. Each unit consists of an alternating current machine 1, for example a generator, connected to a converter consisting of a converter-transformer 2 and a rectifier group 3. The direct current sides of the rectifier groups 3 are connected in series to a direct current power line L. For the sake of simplicity the alternating current sides are shown as single-phased although in practice they will be three-phased. The unit III which is provided with outputs for a local power network 43 is shown in somewhat more detail.

This comprises a group of rectifiers 3 comprising four rectifiers 31–34 in bridge-connection, which rectifier group is connected to the corresponding machine 1 over the converter-transformer 2 provided with rectifier winding 21 and machine winding 22. The machine winding 22 is provided with a fixed output 23 and an adjustable output 24 which are connected to the primary winding 41 on the local network transformer 4, the secondary winding 42 of which is connected to the local network 43. The primary winding 41 is provided with a tap switch and in order to keep the voltage of the local network 43 constant under varying load the tap switch for the primary winding 41 should be connected to the adjustable output 24 on the converter-transformer 2 in such a way that the ratio between the number of turns of the primary winding 41 and the number of turns between the outputs 23 and 24 on the winding 22 is permanently constant. This may for example be done by connecting together the output 24 and the tap switch 41 with a mechanical gear having constant gear ratio, as indicated by the gear 44. Such a gear can be driven, for example, by a motor 45 dependent on any discrepancy in the network voltage of the network 43 from a certain desired voltage value.

FIG. 2 shows another embodiment of the transformers 2 and 4 in FIG. 1. In this case the converter-transformer 2 is provided with a tap switch on the rectifier winding 21 and the local network transformer 4 has been provided with a tap switch on the secondary winding 42. The primary winding 41 for the transformer 4 is connected between the stationary output 23 and an end output 24' on the machine winding 22 of the converter-transformer 2. In principle the arrangement operates in the same way as the arrangement according to FIG. 1, although the connection of the two tap switches is more complicted than according to FIG. 1. The arrangement according to FIG. 1 also has the advantage that the adjustable outputs on the windings 22 and 41 are directly connected so that they have the same potential and the insulation problems in the gear 44 will be minor.

Since all rectifier groups are connected together in series on the direct current side the direct current will be the same in all the converters. However, it is seen that the voltage across the rectifier group 3 in the unit III, that is, the voltage across the rectifier winding 21 in this unit and thus the power in this unit, is reduced in relation to the desired load on the local network 43. This is true of the station is operating as rectifier station. However, if it is operating as inverter station the motor 1 in unit III will have reduced power in relation to the load on the local network.

I claim:

1. Converter station comprising a number of converters the direct current sides of which are connected to a power transmission line and which are connected on the alternating current side to individual alternating current machines through a converter-transformer, in which the converter-transformer of one of said converters is provided with an adjustable output to feed a local network, the connection to said local network comprising an adjustable transformer.

2. Converter station according to claim 1, in which, means are provided combining the control of the adjustable output of said converter-transformer and the control of the adjustable transformer for the local network so as to maintain the output voltage of the transformer of the local network constant.

3. Converter station according to claim 2, in which the adjustable output of the converter-transformer is arranged on its machine winding whereas the local network transformer is provided with a tap switch on the primary side and in which means are provided to control these two transformers so as to maintain the ratio of turns between the primary side of the local network transformer and the number of turns for the output of the converter-transformer constant.

References Cited

UNITED STATES PATENTS 2,742,579    4/1956    Stevens et al. _____ 307—82

FOREIGN PATENTS 363,410    9/1962    Switzerland.

J D MILLER, Primary Examiner

W. H. BEHA, JR., Assistant Examiner

U.S. Cl. X.R.

307—84; 321—27; 313—43.5